(12) United States Patent
Wieczorek et al.

(10) Patent No.: US 8,910,123 B2
(45) Date of Patent: Dec. 9, 2014

(54) AUTOMATED VALIDATION OF GENERATED TEST CASES FOLLOWING CHANGES TO THE UNDERLYING TEST MODEL

(75) Inventors: Sebastian Wieczorek, Mainz (DE); Andreas Roth, Karlsruhe (DE)

(73) Assignee: SAP AG, Walldorf (DE)

( * ) Notice: Subject to any disclaimer, the term of this patent is extended or adjusted under 35 U.S.C. 154(b) by 415 days.

(21) Appl. No.: 13/413,461

(22) Filed: Mar. 6, 2012

(65) Prior Publication Data

US 2013/0239092 A1    Sep. 12, 2013

(51) Int. Cl.
G06F 9/44    (2006.01)

(52) U.S. Cl.
USPC ............................. 717/126; 717/104

(58) Field of Classification Search
USPC .................................. 717/126, 104
See application file for complete search history.

(56) References Cited

U.S. PATENT DOCUMENTS

| | | | |
|---|---|---|---|
| 6,732,356 B1 * | 5/2004 | Chen ............................ | 717/156 |
| 2007/0240113 A1 | 10/2007 | Rosaria | |
| 2008/0127083 A1 * | 5/2008 | Brown et al. ................. | 717/121 |

OTHER PUBLICATIONS

Extended European Search Report assigned in European Patent Application No. EP 13000560.6-1951, mailed May 16, 2014, 6 pages.
Todd L. Graves, et al.; "An Empirical Study of Regression Test Selection", 1998 IEEE, 10 pages.
Bogdan Korel, Luay Tahat, Boris Vaysburg, "Model Based Regression Test Reduction Using Dependence Analysis," Proceedings International Conference on Software Maintenance IEEE Comput. Soc. Los Alamitos, CA. pp. 214-223. 2002.
Luay Tahat, Boris Vaysburg, Bogdan Korel, Atef J. Bader, "Requirement-Based Automated Black-Box Test Generation," 25th Annual International Computer Software and Applications Conference, COMPSAC 2001, IEEE Piscataway, NJ, USA, pp. 489-495. 2001.
Extended European Search Report (from a corresponding foreign application), EP 13000560.6, mailed Apr. 13, 2013.

\* cited by examiner

*Primary Examiner* — Li B Zhen
*Assistant Examiner* — Hang Pan
(74) *Attorney, Agent, or Firm* — Fountainhead Law Group PC

(57) ABSTRACT

Automated checking of test cases when the underlying test model has been modified includes verifying the structure of the original test cases against the new (modified) test model. Verified test cases are assessed by manipulating the new test model to produce corresponding manipulated test models. A test case is still valid for the new test model if a test case can be generated from its corresponding manipulated test model.

15 Claims, 9 Drawing Sheets test case (b)

[x:=6] (A) → Trans_1 → (B) → Trans_3 → ((C))

New Test model, 304

AUTOMATED VALIDATION OF GENERATED TEST CASES FOLLOWING CHANGES TO THE UNDERLYING TEST MODEL

BACKGROUND

Unless otherwise indicated herein, the approaches described in this section are not prior art to the claims in this application and are not admitted to be prior art by inclusion in this section.

Software development and testing of complex software systems may require dedicated methods to tackle special features of the software. Consider, for example, an Enterprise Resource Planning (ERP) system. Manual testing is generally not practicable to systematically test ERP systems due to the involved complexity. Accordingly, an efficient testing approach should be automatic. Model-based testing (MBT) has the potential to enable a high degree of automation in the test design.

MBT solutions put test models into the center of the overall testing process. When the behavior changes from one system version to the other, MBT approaches change the model and re-run the automatic test generation, which often results in major changes in the test suite from version to version. Since state of the art model-based test generators optimize the test cases towards criteria like minimal number of executed test steps or minimal number of test cases, even minimal changes to the original test model can result in a completely different generated test suite.

DETAILED DESCRIPTION

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
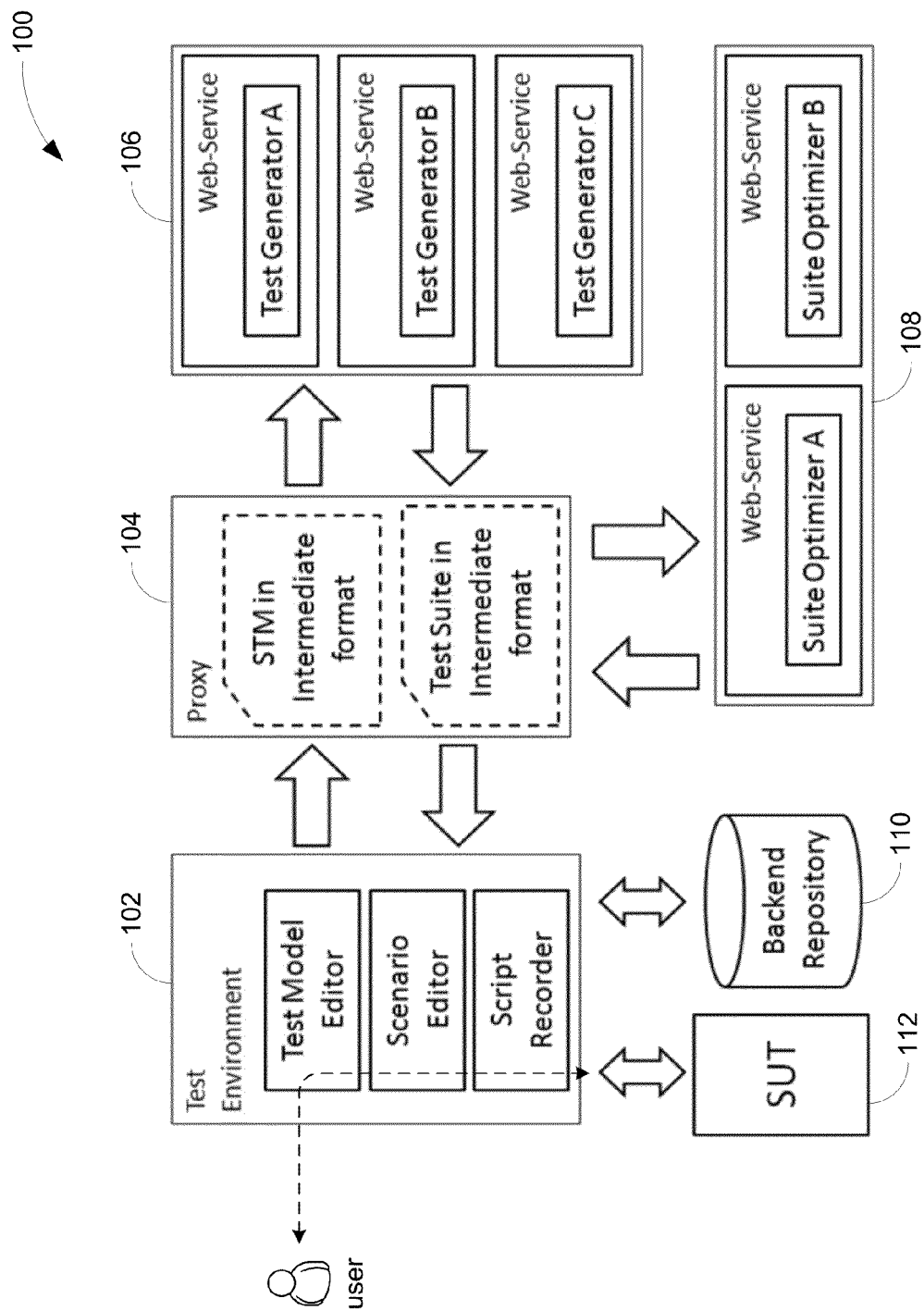
FIG. 1 is high level block diagram of a test system in accordance with embodiments of the present disclosure.

Referring to FIG. 1, a test system 100 in accordance with embodiments of the present disclosure provides capability for testing a system 112. The system under test 112 may be any kind of system. For example, consider an enterprise application. An objective of testing is to gain confidence over the executability of the business processes supported by the enterprise application. System testing may be based, for example, on high level usage scenarios and business requirements that have been defined by business analysts or customers. User interface (UI) based testing is an appropriate vehicle to carry out the tests, as the system can be validated as a whole using access points that are available to the user.

In embodiments, a model based testing (MBT) approach is used to define the behavior of the system under test 112 in terms of actions that change the state of the system. Such an activity-based test model typically contains start and end points and a number of activities, and may be represented using a finite state machine (FSM). An activity corresponds to a step in the process that is supported by the system under test 112.

The test system 100 may include a test environment 102 comprising tools such as a test model editor, a scenario editor, and a script recorder. A data store 110 may be provided to store test models and other information. The test model editor may provide for the creation and editing of activity-based test models, triggering test generation, and visualization of the resulting test suite. A test suite comprises a set of test cases that may be generated by traversing portions of the FSM that represents the test model. The scenario editor generates "scenarios" by assembling a sequence of captured test scripts. A test script is a recorded sequence of events that are generated as the user interacts with the system under test 112. A scenario is an assemblage of test scripts which may represent, for example, a user session. The scenario editor also allows the user to visualize generated executable scenarios obtained from test cases. The script recorder may be connected to the system under test 112 to capture and record test scripts as the user interacts with the system under test. The script recorder may also provide replay functionality which may be used, for example, when performing stepwise execution of a scenario.

The test system 100 may include a proxy 104 to provide a generalized representation for test models and a generalized representation for test suites. The proxy 104 allows the test environment 102 to represent test models and test suites independently of their representation by the underlying components that process the test models and test suites. For example, a test generator 106 may receive a generalized representation of a test model created and managed by the proxy 104 to generate a test suite irrespective of the particular representation and formatting used by the test environment 102. The test suite generated by the test generator 106 may likewise be managed by the proxy 104 in a generalized representation. An optimizer 108 may be employed to perform various optimizations; for example, to reduce the number of test cases in the test suite generated by the test generator 106 and so on. In some embodiments, the test generator 106 may comprise one or more specific types of test generators. In some embodiments, test generator 106 may be accessed as a Web service. An optimizer 108 may or may not be provided for a given test generator, and may be accessed as a Web service.

Figure 2:
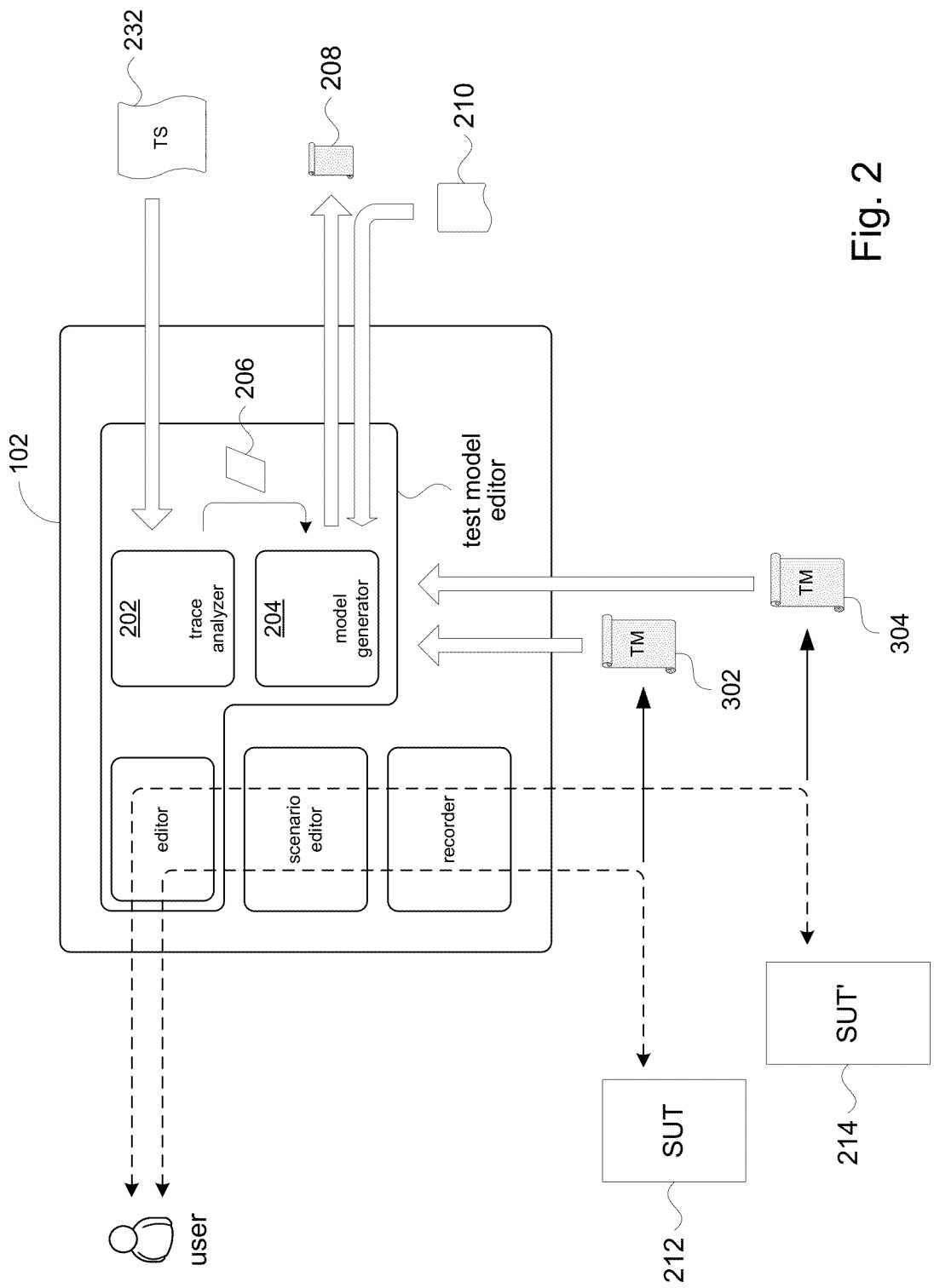
FIG. 2 is an illustrative diagram of a test model editor in accordance with embodiments of the present disclosure.

In accordance with the present disclosure, test system 100 may include functionality to assess previously generated test cases when the system under test 112 is modified, in order to identify test cases from the old system that are still applicable in the modified system. Moreover, this functionality can be implemented using existing components such as test generator 106. Referring to FIG. 2, in some embodiments the test model editor component of the test environment 102 may include a trace analyzer 202 and a model generator 204. A first system under test 212 is shown. A corresponding test model 302 may be specified or otherwise generated by a user interacting with the system 212 within the test environment 102. A second system under test 214 is shown, and may represent a new version of system 212 for example. A corresponding "new" test model 304 may be specified or otherwise generated by the user interacting with the system 214 within the test environment 102. A test suite 232 generated by a suitable test generator (e.g., test generator 106, FIG. 1) may comprise a set of test cases based on the "old" test model 302. As will be explained in more detail below, the test model editor may assess the test cases that comprise test suite 232 to determine whether any of the test cases that were generated for the old test model 302 are still valid under the new test model 304. In accordance with the present disclosure, the assessment involves the old and new test models 302 and 304, and the test suite 232 of test cases that were generated for the old test model 302.

As mentioned above, in some embodiments the test model editor component of the test environment 102 may include a trace analyzer 202 and a model generator 204. The trace analyzer 202 outputs to the model generator 204 a list 206 of "valid" test cases obtained from the list of old test cases generated from the old test model 302. For each given test case in the list 206, a model 208 is generated and sent to the test generator 106. A result 210 is returned from the test generator 106, and depending on the result, the given test case is designated as still being a valid test case for the new test model 304 or not. Additional details of this aspect of the present disclosure are discussed below.

Figure 3:
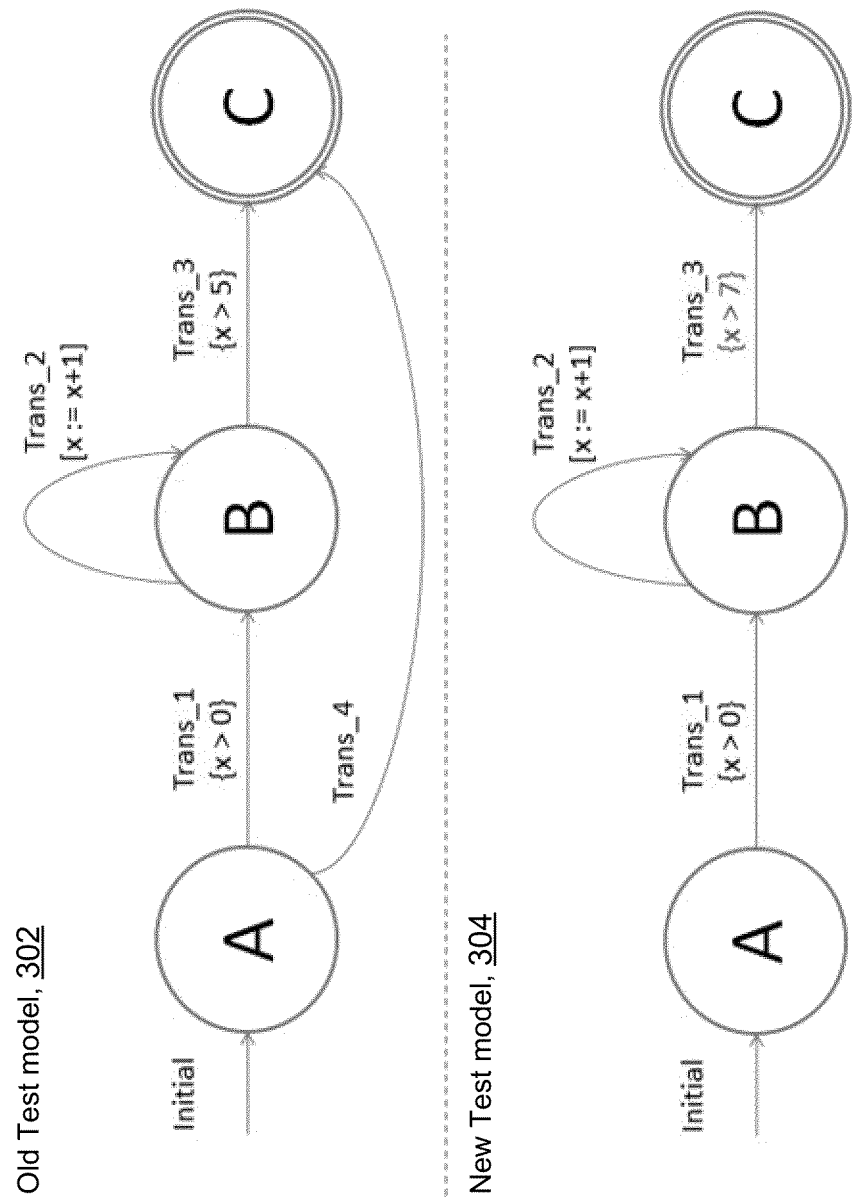
FIG. 3 depict illustrative examples of test models.

Referring to FIG. 3, a test model may be represented by a state transition diagram. Consider the test model 302, for example. The structural elements of test model 302 include vertices (states) A, B, and C, and edges (transitions) Trans_1, Trans_2, Trans_3, and Trans_4. The test model 302 also includes a constraint variable (x) which is used to constrain the traversal of the edges, and in general may comprise any number of variables from the system 212 being modeled by the test model. For example, in the test model 302, the traversal from vertex A to vertex B is permitted only when x>0. Edge traversal may also affect one or more constraint variables, as well as being affected by them. For example, the traversal from vertex B to itself along edge Trans_2 may result in incrementing the variable x.

The test models 302 and 304 will serve as illustrative examples in the discussions to follow. For the sake of discussion, the test model 302 will be deemed to be an example of a test model for the system 212 shown in FIG. 2, and may be referred to as the "old" test model. Likewise, the test model 304 will be deemed to be an example of a test model for the system 214 shown in FIG. 2, and hence may be referred to as the "new test model.

Merely as an example, let Table I below represent a test suite 232 that is generated from the old test model 302. The test suite in Table I comprises the following test cases:

TABLE I a) [x:=0] (A) → Trans_4 → ((C))
b) [x:=6] (A) → Trans_1 → (B) → Trans_3 → ((C))
c) [x:=8] (A) → Trans_1 → (B) → Trans_2 → (B) → Trans_2 → (B) → Trans_3 → ((C))

The variable assignments given in the square brackets in each test case represent a test data configuration for which test execution of that test case will succeed. It will be appreciated the not all test cases are associated with a test data configuration.

Figure 4:
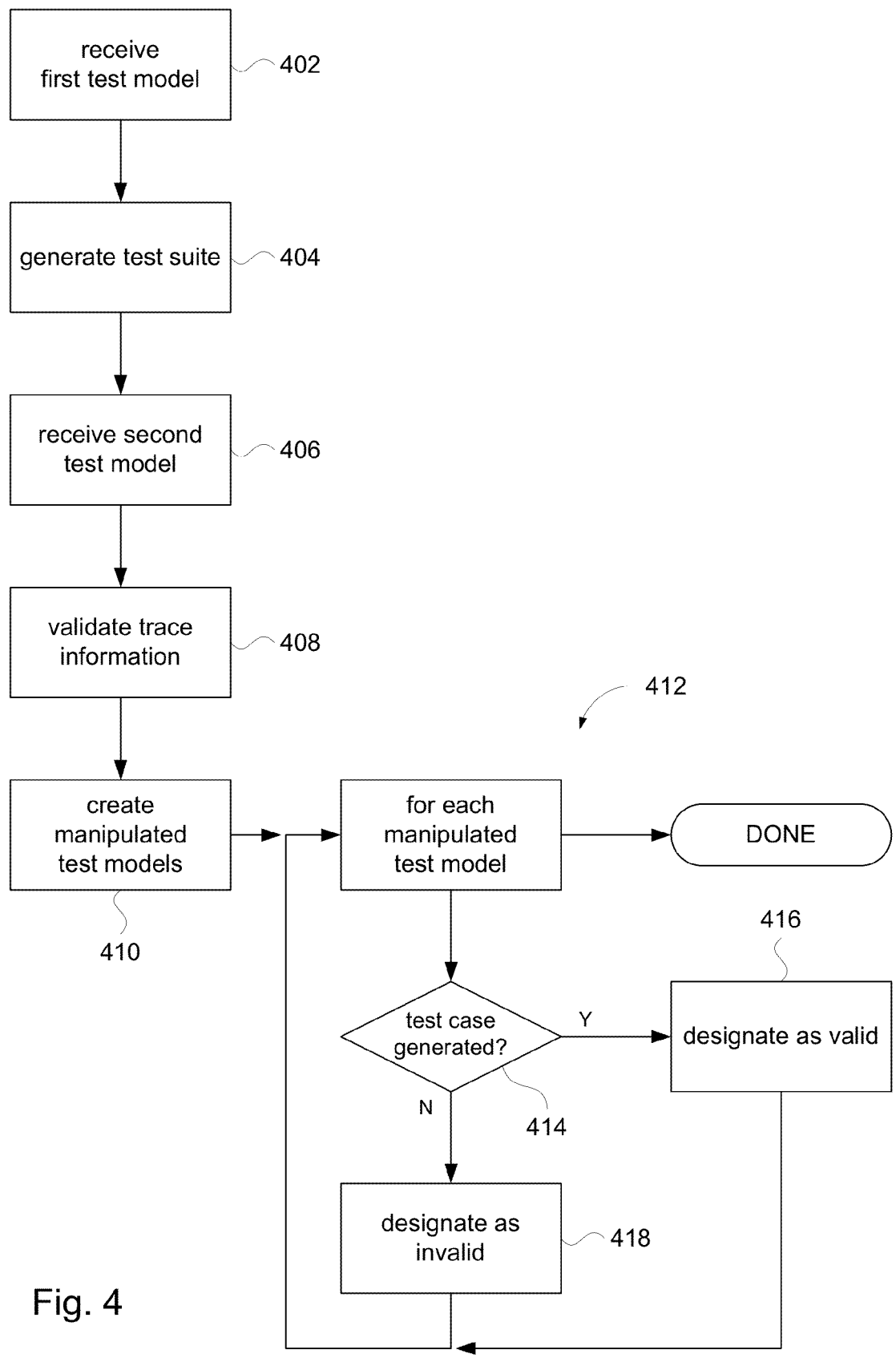
FIG. 4 is a high level work flow of processing that may be performed in accordance with aspects of the present disclosure.

Referring to FIGS. 2 and 4, a process flow to assess test cases comprising a test suite in accordance with embodiments of the present disclosure is shown. The test models 302 and 304 shown in FIG. 3 will serve as a running example for the discussion of FIG. 4.

Figure 5A:
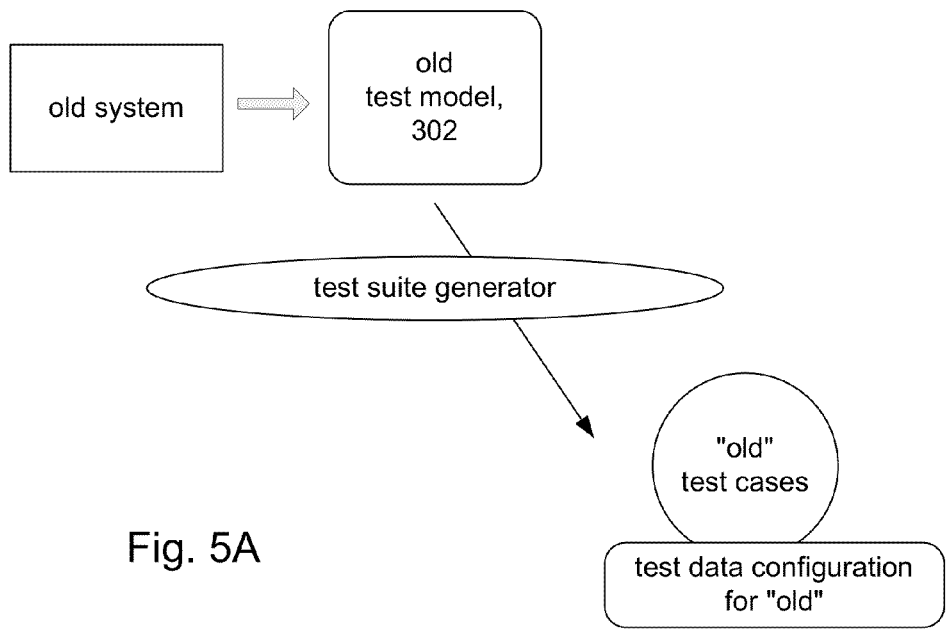
FIGS. 5A, 5B, 5C, and 5D are generic representations of the data flows corresponding to processing shown in FIG. 4.

A first ("old") test model 302 is received in a step 402. Referring to FIG. 2, for example, test model 302 may be received in the trace analyzer 202 as a test model for the old system 212. In a step 404, the trace analyzer 202 may invoke the test generator 106 (FIG. 1) to generate a test suite 232 comprising a plurality of test cases (e.g., Table I) for the old test model 302. FIG. 5A is a generic pictorial representation of the information flow involved in 402 and 404.

Figure 5B:
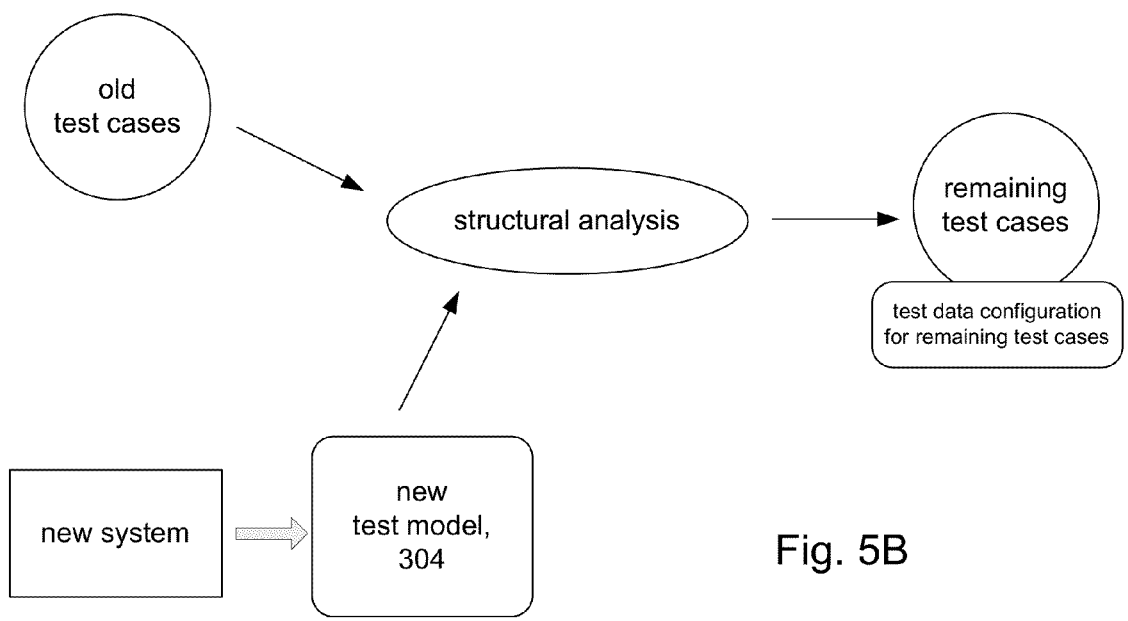

In a step 406, the trace analyzer 202 may receive a second ("new") test model 304. In a step 408, the trace analyzer 202 may validate the structure of each test case by checking the trace information (e.g., vertices and edges) of each test case against the structure in the new test model 304. The result is a list 206 of remaining test cases from the old test suite of test cases. FIG. 5B is a generic pictorial representation of the information flow involved in 406 and 408.

In embodiments, for example, the vertices and edges in each test case may be compared to vertices and edges in the new test model 304. For a given test case, if the vertices in the test case are found in the new test model 304 and the edges in the test case are the same as in the new test model, then the test case is deemed to be structurally supported in the new test model. Consider, for example, the test cases of the old test suite 232 shown in Table I. For test case (a), $$[x:=0](A) \rightarrow Trans\_4 \rightarrow ((C)),$$

a trace analysis would reveal that test case (a) is structurally invalid. Although the same vertices (A and C) occur in the new test model 304, the edge (Trans_4) in test case (a) does not exist in the new test model. Accordingly, test case (a) is deemed structurally invalid.

Test cases (b) and (c), on the other hand, are structurally consistent with the new test model 304. For test case (b), the vertices (A, B, and C) occur in the new test model 304. Test case (b) and the new test model 304 each contain an edge (Trans_1) that connects vertices A and B and an edge (Trans_3) that connects vertices B and C. Accordingly, test case (b) is deemed structurally valid Likewise, test case (c) contains the same vertices as in the new test model 304, namely A, B, and C. Test case (c) and the new test model 304 also include an edge (Trans_1) that connects vertices A and B and an edge (Trans_3) that connects vertices B and C. The edge in test case (c), connecting vertex B to itself, also appears in the new test model 304, namely edge Trans_2. Accordingly, test case (c) is also deemed to be structurally valid. Since the foregoing analysis is based only on structural elements (vertices and edges) of the test cases and the test model, the analysis may be implemented as a simple sequence of queries on their respective structural elements. The list 206 of remaining test cases that are structurally valid with respect to the new test model 304 is shown in Table II below:

TABLE II a) [x:=6] (A) → Trans_1 → (B) → Trans_3 → ((C))
b) [x:=8] (A) → Trans_1 → (B) → Trans_2 → (B) → Trans_2 → (B) → Trans_3 → ((C))

Figure 5C:
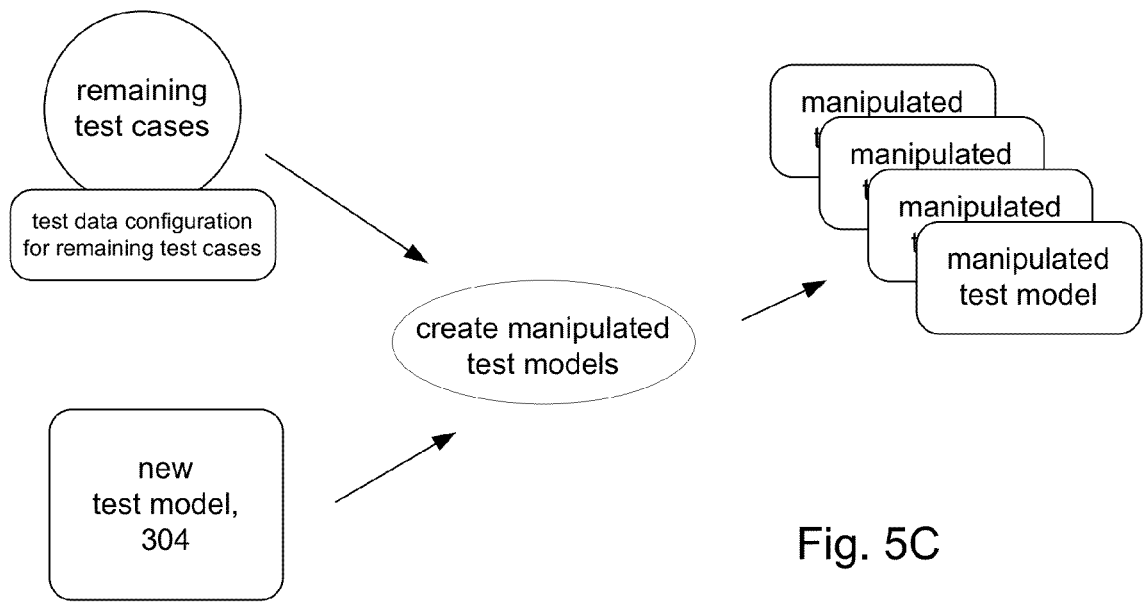

The remaining test cases may then be processed in a step 410 to create corresponding "manipulated" test models. For example, in FIG. 2 the trace analyzer 202 may provide the list 206 of remaining test cases to the model generator 204 to create a corresponding set of manipulated test models. FIG. 5C is a generic pictorial representation of the information flow involved in this step.

In embodiments, the model generator 204 may process each test case in the list 206 to create a corresponding test model by using the new test model 304 as a starting point. For a given test case, the new test model 304 may be modified in accordance with the following rules so that the resulting manipulated test model represents the test sequence of the test case:

1) Create a copy of the new test model, 304.
2) Remove all edges in the new test model 304 which are not contained in the given test case.
3) Unfold one or more test paths in the new test model 304 by copying and inserting edges and vertices that are traversed more than once, in order to obtain the same test sequence as in the given test case.

Figure 6A:
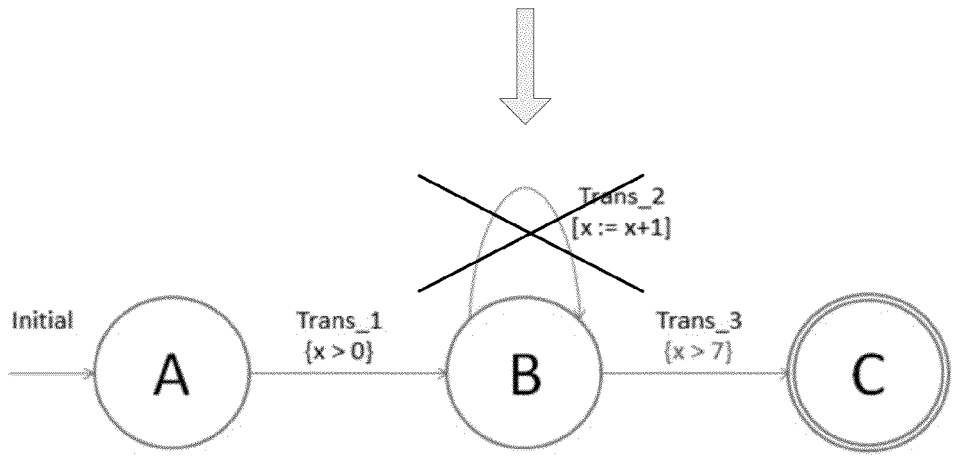
FIGS. 6A and 6B illustrate examples of model manipulation in accordance with the present disclosure.
Figure 6A:
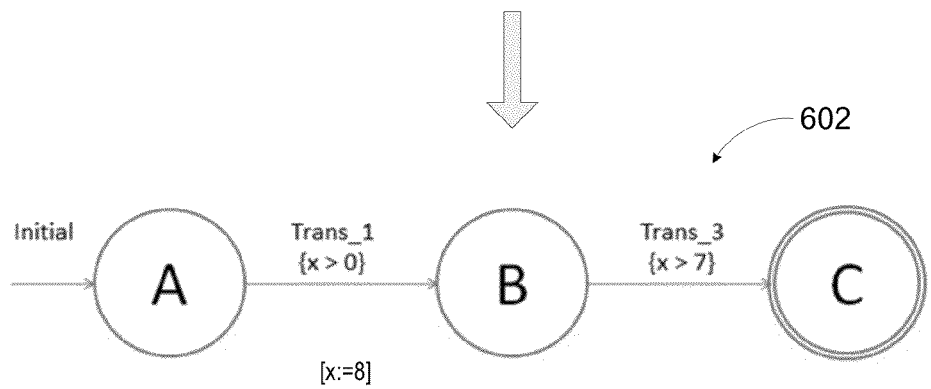
Figure 6A:
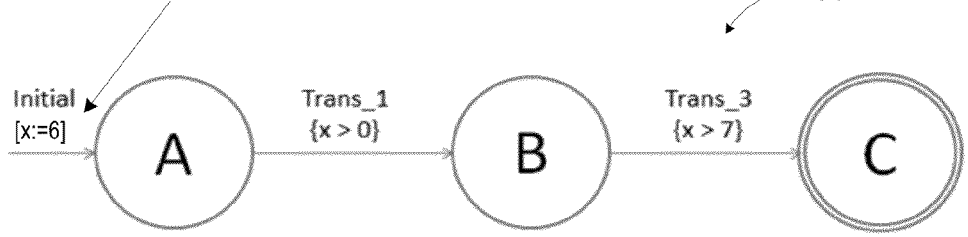

An example of the foregoing manipulations is shown in FIG. 6A for test case (b). The new test model 304 is shown being manipulated by eliminating an edge (Trans_2) to create manipulated test model 602. It can be seen that the resulting test model 602 represents the test sequence of test case (b).

In some scenarios, however, a test case is not only identified by its trace, but also by its data configuration. Test case (b), for example, includes a data configuration x:=6. Accordingly, the manipulated test model 602 may incorporate, as its initialization data, the data configuration of test case (b), which is represented by test model 602'.

Figure 6B:
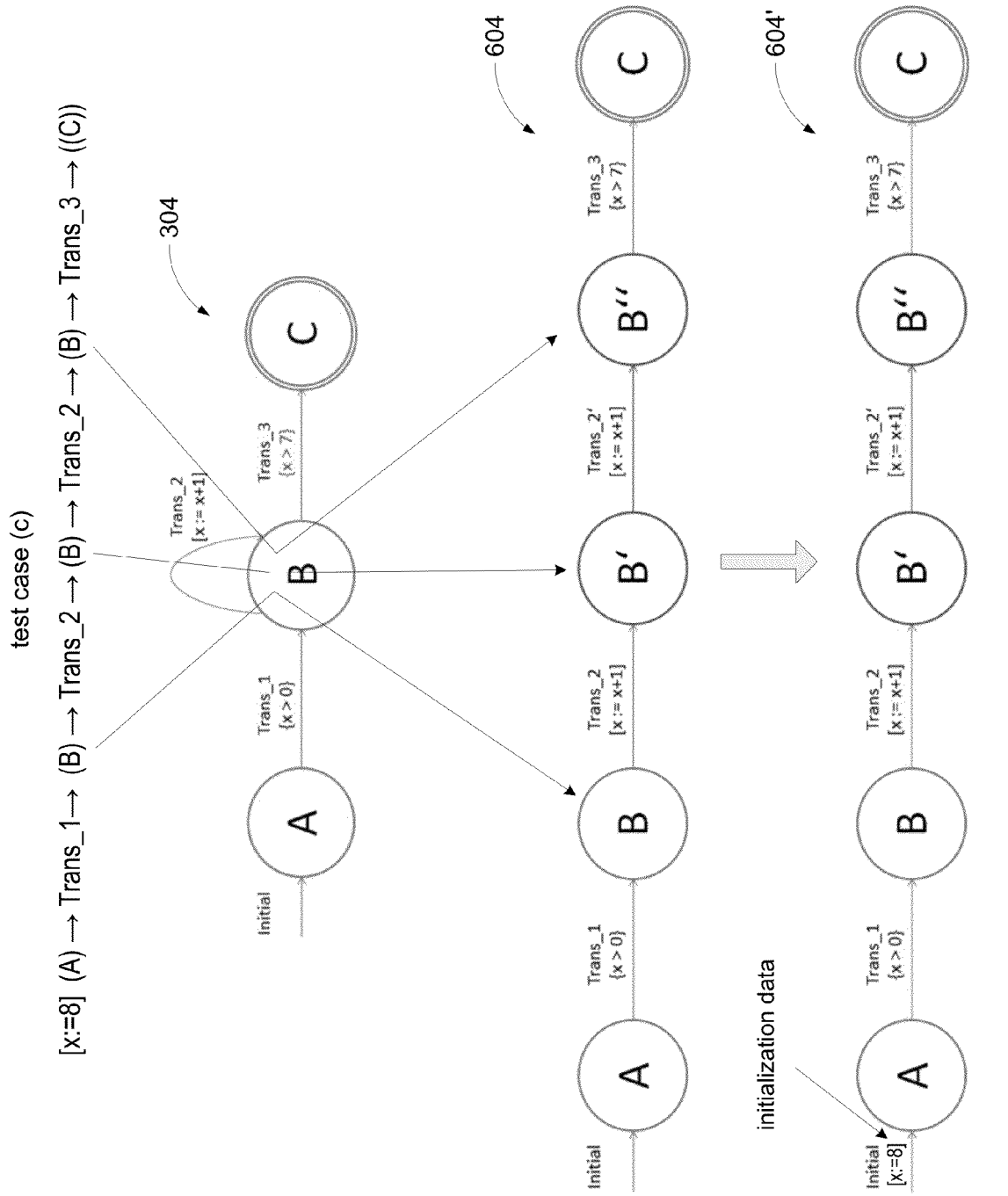

FIG. 6B shows another example, for test case (c). This test case includes an example of a test sequence that causes "unfolding" of a test path in the new test model 304 in order to create manipulated test model 604. Test model 604' includes, as initialization data, the data configuration from test case (c), namely x:=8.

Figure 5D:
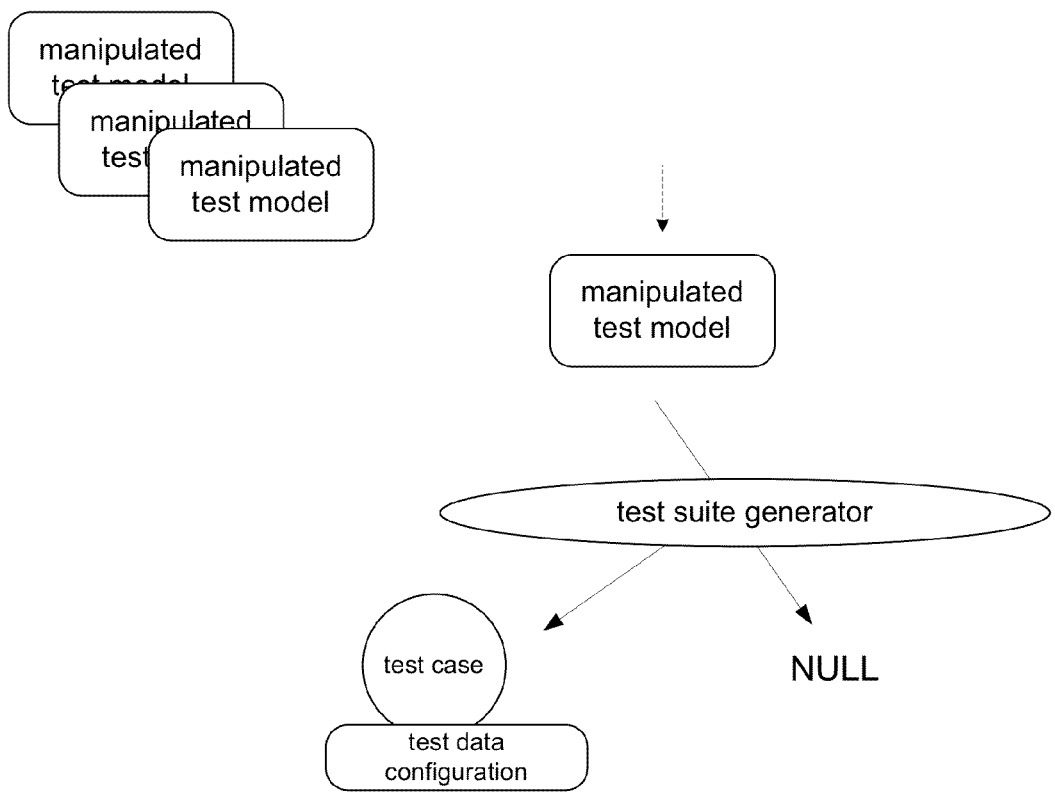

Continuing with FIG. 4, processing proceeds to loop 412, where the test generator 106 is triggered (step 414) for each manipulated test model that was created in step 410. If the test case corresponding to a given manipulated test model is valid for the new test model 304, then the result 210 (FIG. 2) from test generator 106 will be a test suite that is generated from the given test model. The corresponding test case is then designated, in a step 416, as being a valid test case for the new test model 304. If, on the other hand, the test generator 106 does not produce a test suite, then the corresponding test case is designated, in a step 418, as not being a valid test case for the new test model 304. For example, the result 210 from test generator 106 may be a NULL test suite, or an error code, or some other suitable negative response. FIG. 5D is a generic pictorial representation of the information flow involved in this step.

In embodiments of step 414, when the test generator 106 is invoked for a given manipulated test model to generate a test suite, the test generator 106 will incorporate any initialization data that may be associated with the given test model. Thus, where there is initialization data, the test generator 106 will generate a test suite if the test suite can be executed with the original data configuration of the test case from which the manipulated test model was created.

Consider, for example, test case (b). The manipulated test model 602' in FIG. 6A corresponds to test case (b), including the initialization data derived from the data configuration of the test case, namely x:=6. The test generator 106 will not be able to generate a valid test case from test model 602' because the transition (Trans_3) from vertex B to C (which requires x>7) is not permitted due to the constraint imposed by the initialization data, namely x:=6. Accordingly, test case (b), which is valid for the old test model 302, is not a valid test case for the new test model 304. By comparison, notice that for test model 602, where the initialization data is omitted, the test generator 106 would produce the following test case:

$$[x:=8](A) \to Trans\_ \to (B) \to Trans\_3 \to ((C)),$$

where the data configuration sets X to 8 so that the transition (Trans_3) can occur. The fact that the original test case (b) for the old test model 302 allows for a data configuration of x:=6, indicates this test case is not a valid test case for the new test model 304.

Consider the test case (c). The manipulated test model 604' in FIG. 6B corresponds to test case (c), which includes the initialization data derived from the data configuration of the test case, namely x:=8. For test model 604', the test generator 106 will generate a valid test case from the model because the initialization data (x:=8) allows for each of the edges, Trans_1, Trans_2, Trans_2', and Trans_3, to be generated. By comparison, note that for test model 604, where the initialization data is omitted, the test generator 106 would produce the following test case:

$$[x:=6](A) \to Trans\_1 \to (B) \to Trans\_2 \to (B) \to Trans\_2 \to (B) \to Trans\_3 \to ((C)),$$

where the data configuration sets X to 6, since that is a sufficient initial condition that test execution of the test case will succeed. This example illustrates that multiple valid test cases may exist for a given test model. The test case where the data configuration is x:=6 is valid, and so is the test case where the data configuration is x:=8.

Figure 7:
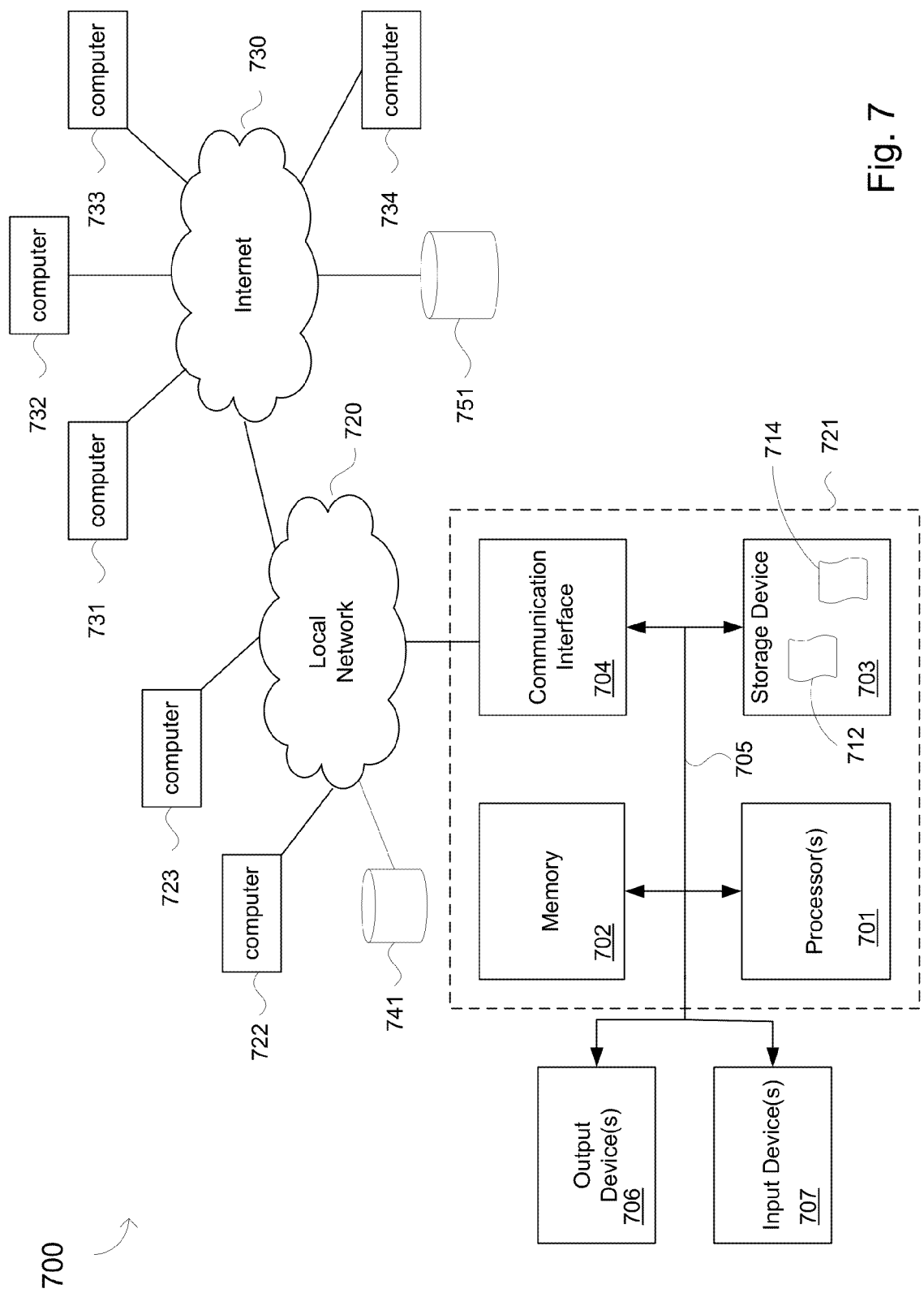
FIG. 7 is a high level system block diagram according to an embodiment of the present disclosure.

FIG. 7 is a block diagram of a system 700 according to some embodiments. The system 700 includes computers 721-723 and one or more storage systems 741 interconnected by a local network 720 such as a Local Area Network (LAN), a Wide Area Network (WAN), and the like. In some embodiments, the system 700 may include computers 731-734 and one or more storage systems 751 connected to the Internet 730. The local network 720 may be connected to the Internet 730.

Each computer (e.g., computer 721) may be configured as a general purpose computing apparatus and may execute program code to perform any of the functions described herein. For example, computer 721 may be a client system that hosts the test environment 102 shown in FIG. 1. Another computer (e.g., 722) may be a server that hosts the test generator 106.

Each computer (e.g., computer 721) includes, among its components, a processor component 701 (comprising one or more processing units) operatively coupled to a communication interface 704, a data storage device 703, one or more input devices 707, one or more output devices 706, and a memory 702. The communication interface 704 may facilitate communication on the local network to access other systems, such as storage system 741 for example.

Input device(s) 707 may include, for example, a keyboard, a keypad, a mouse or other pointing device, a microphone, knob or a switch, an Infra-Red (IR) port, a docking station, a touch screen, and so on. Input device(s) 707 may be used, for example, to enter information into the computer. Output device(s) 706 may include, for example, a display (e.g., a display screen), a speaker, a printer, and so on. Additional elements (not shown) may be including according to some embodiments.

The data storage device 703 may comprise any appropriate persistent storage device, including combinations of magnetic storage devices (e.g., magnetic tape, hard disk drives and flash memory), optical storage devices, Read Only Memory (ROM) devices, etc., while memory 702 may comprise Random Access Memory (RAM).

The data storage device 703 may store program code 712 which may be executed by the processor component 701 to cause the computer to perform any one or more of the processes and methods described herein; for example, the components of the test environment 102, or the test generator 106, and so on. Embodiments are not limited to execution of these processes by a single apparatus.

The data storage device 703 may store data structures 714 such as object instance data, runtime objects, and any other data described herein. The data storage device 703 may also store data and other program code for providing additional functionality and/or which are necessary for operation thereof, such as device drivers, operating system files, etc.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. It will be appreciated that embodiments are not limited to any specific combination of hardware and software. Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

Advantages and Technical Effect

In industrial testing, test suites are used to compare the quality between different versions. Therefore only test cases which are not executable any more should be replaced in test suites from one version to another. This practice is preferred over the above-mentioned optimization of the test suite. Various solutions for computing the inclusion of a trace (test case) in a graph (test model) exist, but they all demand the provision of additional complex model transformations and tool support to the test environment. Embodiments in accordance with the present disclosure can avoid the need for such additional modeling tools, allowing for existing tools (e.g., test generator) to be used.

What is claimed is:

1. A method of operating a computer system to validate test cases for test models comprising operating the computer system to perform steps of:
receiving information for a first state transition diagram representative of a first test model that models a system under test (SUT);
generating first test cases from the first test model using a test generator, each test case comprising a plurality of states in the first state transition diagram and a plurality of transitions between the states;
receiving information for a second state transition diagram representative of a second test model that models a new version of the SUT; and
for each test case among some of the first test cases:
generating a third test model corresponding to said each test case using information for the second test model, including modifying a copy of the second test model by removing edges in the copy of the second test model that are not in said each test case, and copying and inserting edges and vertices that are traversed more than once in order to obtain the same test sequence as in said each test case; and
designating said each test case as being valid or invalid for the second test model depending on whether or not the test generator can generate any test cases from the third test model.

2. The method of claim 1 wherein if said each test case is associated a data constraint, then generating the third test model includes incorporating the data constraint.

3. The method of claim 1 further comprising eliminating one or more test cases from among the first test cases.

4. The method of claim 3 wherein eliminating one or more test cases from among the first test cases includes comparing each first test case with the second test model, wherein said each first test case is deemed eliminated depending on the comparison.

5. The method of claim 4 wherein the comparison includes comparing a structure of said each first test case with a structure of the second test model.

6. A system for validating test cases for test models comprising:
a processor; and
a data store having stored thereon executable program code configured to caused the processor to:
receive information for a first state transition diagram representative of a first test model that models a system under test (SUT);
generate first test cases from the first test model using a test generator, each test case comprising a plurality of states in the first state transition diagram and a plurality of transitions between the states;
receive information for a second state transition diagram representative of a second test model that models a new version of the SUT; and
for each test case among some of the first test cases:
generate a third test model corresponding to said each test case using information for the second test model, including modifying a copy of the second test model by removing edges in the copy of the second test model that are not in said each test case, and copying and inserting edges and vertices that are traversed more than once in order to obtain the same test sequence as in said each test case; and
designate said each test case as being valid or invalid for the second test model depending on whether or not the test generator can generate any test cases from the third test model.

7. The system of claim 6 wherein if said each test case is associated a data constraint, then the third test model incorporates the data constraint.

8. The system of claim 6 further comprising eliminating one or more test cases from among the first test cases.

9. The system of claim 8 wherein the one or more test cases are eliminated from among the first test cases based on a comparison of each first test case with the second test model.

10. The system of claim 9 wherein the comparison includes a comparison of a structure of said each first test case with a structure of the second test model.

11. A non-transitory computer-readable storage medium having stored thereon computer executable program code comprising program code configured to cause a computer to perform steps of:
- receiving information for a first state transition diagram representative of a first test model that models a system under test (SUT);
- generating first test cases from the first test model using a test generator, each test case comprising a plurality of states in the first state transition diagram and a plurality of transitions between the states;
- receiving information for a second state transition diagram representative of a second test model that models a new version of the SUT; and
- for each test case among some of the first test cases:
  - generating a third test model corresponding to said each test case using information for the second test model, including modifying a copy of the second test model by removing edges in the copy of the second test model that are not in said each test case, and copying and inserting edges and vertices that are traversed more than once in order to obtain the same test sequence as in said each test case; and
  - designating said each test case as being valid or invalid for the second test model depending on whether or not the test generator can generate any test cases from the third test model.

12. The non-transitory computer-readable storage medium of claim 11 wherein the third test model includes a data constraint associated with said each test case.

13. The non-transitory computer-readable storage medium of claim 12 wherein the computer executable program code further comprises program code configured to cause a computer to perform steps of eliminating one or more test cases from among the first test cases.

14. The non-transitory computer-readable storage medium of claim 13 wherein eliminating one or more test cases from among the first test cases includes comparing each first test case with the second test model, wherein said each first test case is deemed eliminated depending on the comparison.

15. The non-transitory computer-readable storage medium of claim 14 wherein the comparison includes comparing a structure of said each first test case with a structure of the second test model.

* * * * *